United States Patent [19]
Corrigan, III et al.

[11] Patent Number: 5,790,601
[45] Date of Patent: Aug. 4, 1998

[54] LOW COST VERY SMALL APERTURE SATELLITE TERMINAL

[75] Inventors: John E. Corrigan, III, Chevy Chase, Md.; Mohammad Soleimani, Abbasabad Tehron, Islamic Rep. of Iran; Osamu Yamamoto; Susumu Otani, both of Tokyo, Japan

[73] Assignee: Hughes Electronics, Los Angeles, Calif.

[21] Appl. No.: 523,309

[22] Filed: Sep. 5, 1995

Related U.S. Application Data

[63] Continuation of Ser. No. 391,815, Feb. 21, 1995, abandoned.
[51] Int. Cl.$^6$ ............................................. H03K 7/06
[52] U.S. Cl. .................. 375/302; 375/303; 375/305; 332/100; 332/117; 455/121; 455/113; 455/118; 455/119; 455/126
[58] Field of Search ........................... 375/271, 274, 375/302, 303, 305; 332/100, 117, 127; 455/3.2, 121, 42, 98, 110, 127, 129, 112, 113, 115, 118, 119, 126

[56] References Cited

U.S. PATENT DOCUMENTS

| | | | |
|---|---|---|---|
| 3,789,302 | 1/1974 | Rearwin et al. | 455/112 |
| 4,475,242 | 10/1984 | Rafal et al. | 455/3.1 |
| 4,509,198 | 4/1985 | Nagatomi | 455/3.2 |
| 4,592,093 | 5/1986 | Ouchi et al. | 455/3.2 |
| 4,932,070 | 6/1990 | Waters et al. | 455/10 |
| 5,208,829 | 5/1993 | Soleimani et al. | 455/12.1 |
| 5,309,479 | 5/1994 | Cheah | 375/62 |
| 5,376,941 | 12/1994 | Fukazawa et al. | 342/359 |
| 5,392,450 | 2/1995 | Nossen | 455/12.1 |
| 5,454,009 | 9/1995 | Fruit et al. | 375/202 |
| 5,578,972 | 11/1996 | Hadden et al. | 333/135 |
| 5,589,837 | 12/1996 | Soleimani et al. | 342/359 |
| 5,606,290 | 2/1997 | Pang | 331/1 A |
| 5,608,761 | 3/1997 | Opas et al. | 375/296 |

OTHER PUBLICATIONS

Hannah et al., U.S. Patent Application Serial No. 08/405, 688, "Very Small Aperture Satellite Terminal," filed Mar. 17, 1995.

S. Kumar et al, "Direct Generation of MSK Modulation at microwave frequencies", Conference 1981 IEEE MTT-S International Microwave Symposium Digest, Los Angeles, CA, USA, Jun. 1981.

Yoshiteru Morihiro et al, "A 100 Mbit/s Prototype MSK Modem for Satellite Communications", IEEE Transactions on Communications, vol. COM-27, No. 10, Oct. 1979.

*Primary Examiner*—Stephen Chin
*Assistant Examiner*—Amanda T. Le
*Attorney, Agent, or Firm*—John T. Whelan; Wanda Denson-Low

[57] ABSTRACT

A remote ground terminal transmitter for transmitting a modulated data signal having a constant envelope amplitude. The remote ground terminal transmitter comprises a source of data signals, a modulator for providing a carrier signal, receiving a data signal from the source of data signals, and modulating the carrier signal with the received data signal so as to produce a constant envelope minimum shift key modulation signal. The transmitter further comprises a power amplifier which operates in the saturation mode to amplify the modulated carrier signal produced by the modulator to the desired power level.

24 Claims, 3 Drawing Sheets

5,790,601

1

LOW COST VERY SMALL APERTURE SATELLITE TERMINAL

This application is a continuation of application Ser. No. 08/391,815 filed Feb. 21, 1995, now abandoned.

BACKGROUND OF THE INVENTION

Satellite communication systems typically have employed large aperture antennas and high power transmitters for establishing an uplink to the satellite. Recently, however, very small aperture antenna ground terminals, referred to as remote ground terminals, have been developed for data and voice transmission at low rates. Typically, in such systems, the remote ground terminals are utilized for communicating via a satellite from a remote location to a central hub station. The central hub station communicates with multiple remote ground terminals, and has a significantly larger antenna aperture, as well as a significantly larger power output capability than any of the remote ground terminals. In some applications, especially where path transit delay is critical, such as voice communications, direct remote ground terminal to remote ground terminal arrangements are utilized.

The viability of the remote ground terminal concept increases as the cost for providing a remote ground terminal at the remote location decreases. In pursuit of this objective, various techniques have been utilized to reduce the cost of the remote ground terminal. For example, U.S. Pat. No. 5,208,829 describes a spread spectrum technique that maximizes the power output from a satellite so as to allow a cost saving reduction in the size of the antenna of the remote ground terminal. U.S. Pat. No. 5,309,479 describes a remote ground terminal comprising a low cost transmitter for producing an FSK (frequency-shift keying) modulated uplink signal which is utilized to communicate with the central hub station via the satellite.

Notwithstanding these cost saving techniques, a problem remains in that the prior art remote ground terminals utilize various modulation techniques, such as PSK (phase-shift keying), which require the amplitude of the carrier signal (i.e., uplink signal) to vary. As a result, the known remote ground terminals require the use of a linear power amplifier for amplifying the modulated uplink signal so as to maintain the precise shape of the modulated signal. However, the linear power amplifier represents a substantial portion of the total cost of the remote ground terminal.

Furthermore, the use of the linear power amplifier requires the remote ground terminal to contain additional circuitry dedicated to controlling gain variations in the transmitter chain producing the modulated uplink signal. Typically, the transmitter chain of a remote ground terminal utilizing PSK modulation produces power variations of 5db or more over the required operating temperature range. If uncorrected, these power variations in the modulated uplink signal would result in excessive power usage in the satellite and create difficulties for the central hub station receiver.

Finally, linear power amplifiers operating in the frequency ranges applicable for communications via a remote ground terminal, which is typically in the Ku band, attain only a 10–15% power added efficiency rating.

Accordingly, in order to reduce the cost and increase the efficiency of remote ground terminals transmitting Ku band modulated uplink signals, there exists a need for a remote ground terminal which does not require the use of a linear power amplifier to modulate the uplink signal, or the circuitry associated therewith for controlling the power variations in the uplink signal, while maintaining efficient use of both bandwidth and power.

2

SUMMARY OF THE INVENTION

The present invention provides a remote ground terminal transmitter for transmitting Ku band modulated uplink signals designed to satisfy the aforementioned needs. Specifically, the invention comprises a novel transmitter design that is simple, eliminates the need for a linear power amplifier, increases power efficiency and substantially reduces the overall cost of the remote ground terminal relative to the prior art designs.

Accordingly, the present invention relates to a transmitter for transmitting a modulated data signal having a constant envelope amplitude to a satellite. In a first embodiment, the transmitter comprises a source of data signals, a modulator for providing a carrier signal, receiving a data signal from the source of data signals, and modulating the carrier signal with the received data signal so as to produce a constant envelope minimum shift key ("MSK") modulated carrier signal. The transmitter further comprises a power amplifier which operates in the saturation mode to amplify the MSK modulated carrier signal generated by the modulator to the desired power level.

The present invention also relates to a method for transmitting Ku band modulated uplink signals to a satellite, which comprises receiving data from a data source, generating a carrier signal and modulating the carrier signal in accordance with data received from the data source so as to produce a modulated carrier signal having a constant envelope amplitude.

As described in detail below, the transmitter of the present invention provides important advantages. For example, the MSK modulated carrier signal can be modulated by a saturated amplifier. In addition, the novel transmitter provides a reduction in the overall power consumption of the remote ground terminal.

Another advantage of the transmitter of the present invention is that it simplifies the circuitry necessary for controlling the output power level of the transmitted uplink signal.

The invention itself, together with further objects and attendant advantages, will best be understood by reference to the following detailed description, taken in conjunction with the accompanying drawings.

DETAILED DESCRIPTION OF THE DRAWINGS

Figure 1:
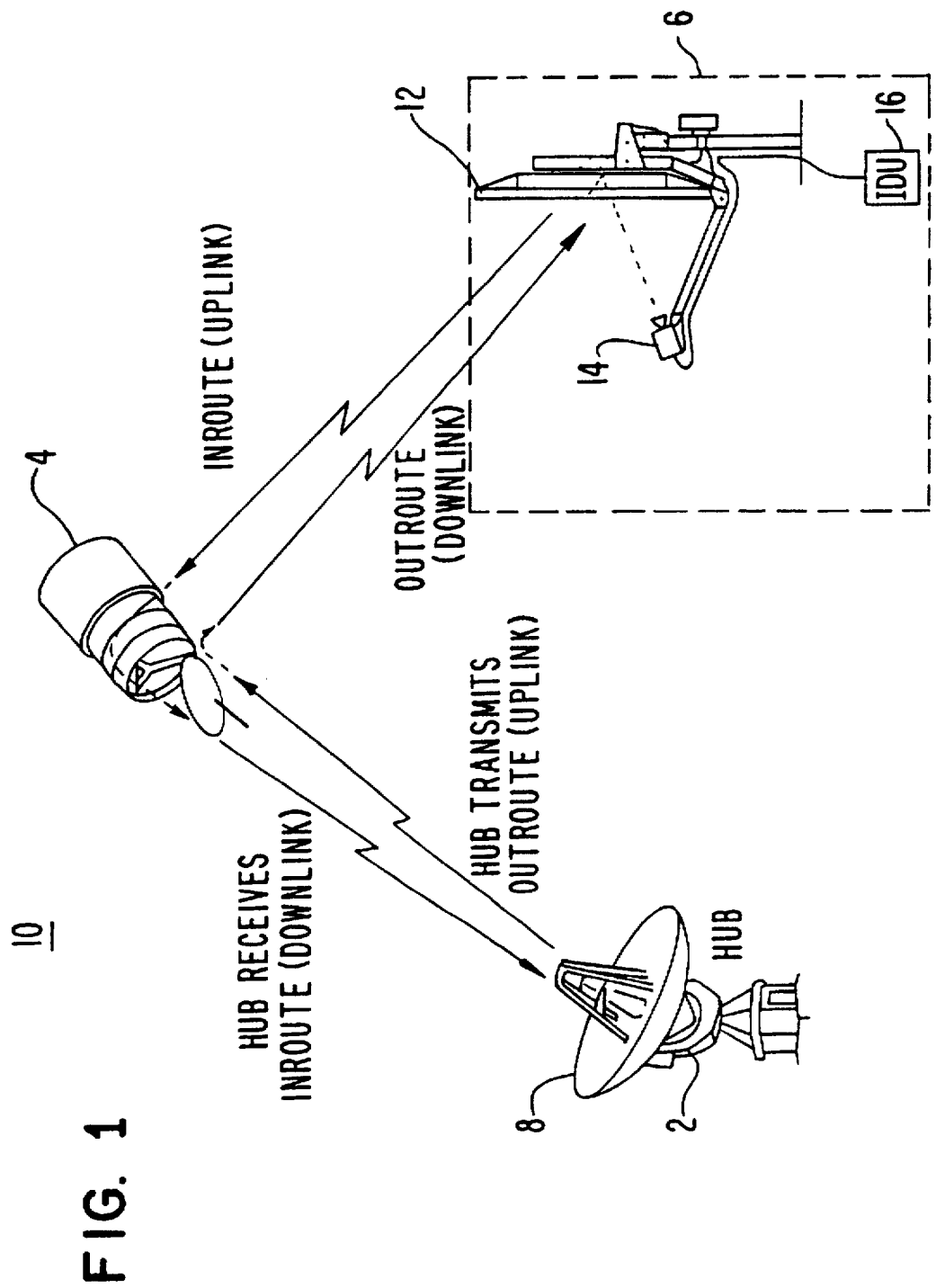
FIG. 1 is a block diagram of a VSAT satellite communication network which utilizes the present invention.

The VSAT satellite communication network 10 illustrated in FIG. 1, comprises a central hub station 2, a communication satellite 4, and a plurality of remote ground terminals 6 (only one is shown). The VSAT network 10 functions as a two way transmission system for transferring data and voice communications between the central hub station 2 and the numerous remote ground terminals 6. All data is transferred between the central hub station 2 and the remote ground terminals 6 via transponders located in the satellite 4. Signals transmitted from the central hub station 2 to the remote ground terminals 6 are referred to as "outroute", while signals transmitted in the opposite direction are referred to as "inroute".

As stated, the central hub station 2 supports a plurality of remote ground terminals 6. The central hub station 2 comprises a large antenna 8 so as to allow for the transmission of a signal sufficiently strong such that the signal can be received by the VSAT remote ground terminals 6 which have relatively small antennas. The large antenna 8 of the central hub station 2 also compensates for the relatively weak signals (inroute) transmitted by the remote ground terminals 6.

As shown in FIG. 1, the communication satellite 4 functions as a microwave relay. It receives uplink signals from both the central hub station 2 and the remote ground terminals 6 at a first frequency and then retransmits the signal at a second frequency. The satellite 4 comprises at least a transponder which receives, amplifies and retransmits each signal within a predefined bandwidth. The transponders of the VSAT network 10 shown in FIG. 1 can operate in various frequency bands, for example Ku and C band.

The remote ground terminal 6 comprises a small aperture antenna 12 for receiving and transmitting the downlink and uplink signals, respectively; an outdoor unit 14 typically mounted proximate the antenna 12 which comprises a transmitter for producing and transmitting a modulated uplink signal; and an indoor unit 16 which operates as an interface between the user's communication equipment (e.g., data terminals, personal computers, monitoring equipment and telephone equipment) and the outdoor unit 14.

More specifically, the indoor unit 16 receives data from the user's equipment (not shown in FIG. 1) and transfers this data to the outdoor unit 14. The transmitter of the outdoor unit 14 functions to produce and modulate a carrier signal in accordance with the data received from the indoor unit 16 and then transmit this signal (i.e. uplink) to the satellite 4. Upon receipt by the central hub station 2, the modulated carrier signal is demodulated such that the data transmitted from the remote user is reproduced and processed by the central hub station 2.

The present invention provides a transmitter which utilizes minimum shift keying to modulate the carrier signal in accordance with the data received from the indoor unit 16. The minimum shift keying modulation technique provides a modulated carrier signal having a constant amplitude envelope and a continuous phase waveform. Minimum shift keying is a special form of quadrature phase shift keying, which produces a signal comprising a constant envelope and a continuous phase by having the carrier move from one phase state to the next in pie/2 increments. As a result, only the phase of the carrier signal is modulated and a high power non-linear amplifier (i.e., saturated) can be utilized to amplify the modulated carrier signal.

Figure 2:
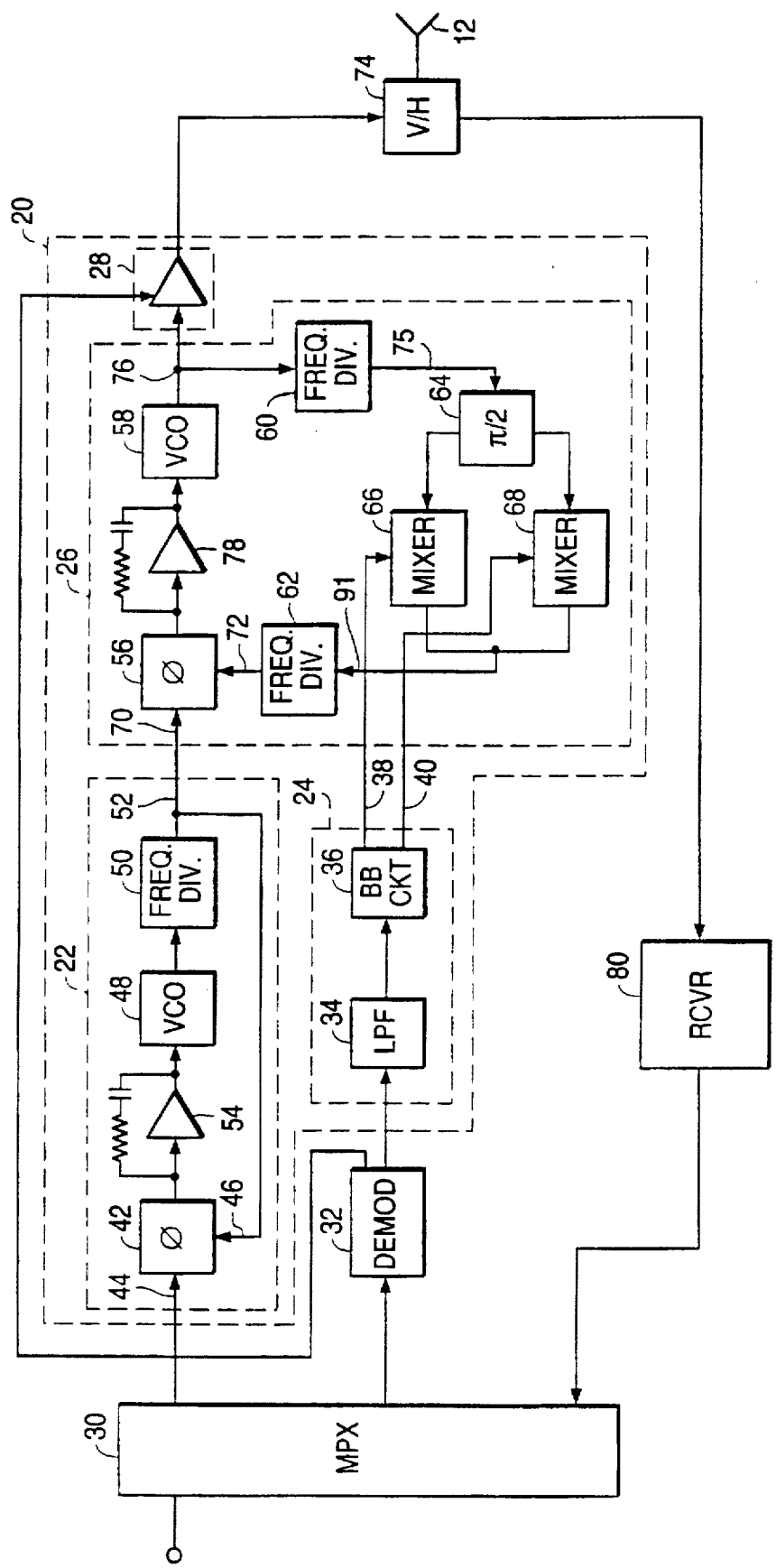
FIG. 2 is a schematic diagram of one embodiment of an outdoor unit comprising the transmitter of the present invention.

FIG. 2 illustrates one embodiment of a transmitter 20 according to the present invention. Specifically, the transmitter 20 is shown as part of the outdoor unit 14 of the VSAT network 10 shown in FIG. 1. As shown in FIG. 2, the transmitter 20 comprises a phase-locked loop circuit 22 for generating a first intermediate frequency (IF) signal, a source 24 for supplying data signals to be modulated onto a carrier signal, an MSK modulator 26 for producing the modulated carrier signal and a power amplifier 28 for amplifying the modulated carrier signal.

The operation of the transmitter 20 of the present invention is now explained in conjunction with the operation of the outdoor unit 14 of the VSAT network 10 of FIG. 1. The outdoor unit 14 comprises a multiplexor 30 which receives a signal from the indoor unit 16. This signal provides a 111 MHz reference signal 31, DC power and 40 MHz modulated control signal 33 to the outdoor unit 14. As shown in FIG. 2, the multiplexor 30 couples the 111 MHz reference signal 31 to the input of the phase-locked loop circuit 22 of the transmitter 20, and couples the 40 MHz control signal 33 to the data source 24 of the transmitter 20.

The 40 MHz control signal 33 serves two purposes: 1) it transfers the data to be modulated onto the carrier signal from the indoor unit 16 to the outdoor unit 14; and 2) its presence at the outdoor unit 14 turns the power amplifier 28 on so as to allow transmission of the MSK modulated carrier signal generated by the transmitter 20. As stated, the 40 MHz signal 33 is coupled to the input of the data source 24 of the transmitter 20. In this embodiment, the data source 24 comprises a demodulator 32, a low pass filter 34 and a baseband circuit 36. The demodulator 32 receives and demodulates the 40 MHz signal 33 so as to recreate the digital data forwarded by the indoor unit 16. The digital signal is preferably passed through a low pass filter 34 and then coupled to the baseband circuit 36. The baseband circuit 36 produces baseband analog quadrature signals 38,40 in accordance with the digital data input signal. The baseband analog quadrature signals 38,40 are coupled to the MSK modulator 26 and are utilized to modulate the carrier signal. In one embodiment, the baseband circuit 36 generates the analog quadrature signals 38,40 via read only memory and comprises a pulse shaping filter for filtering the analog quadrature signals. The demodulator 32 also reproduces a carrier control signal 47 transmitted from the indoor unit 16, which is utilized to activate the power amplifier 28 of the transmitter.

The phase-locked loop circuit 22 of the transmitter 20 comprises a phase comparator 42 having a first and second input 44,46, a voltage controlled oscillator 48 and a frequency divider 50. The phase-locked loop circuit 22 functions to produce a first IF signal 52 which is coupled to the MSK modulator 26. As shown in FIG. 2, in the present embodiment, one input 44 of the phase comparator 42 receives the 111 MHz signal 31 output by the indoor unit 16 via the multiplexor 30. The output of the phase comparator 42 is coupled to the input of the voltage controlled oscillator 48 via a low pass filter 54. The output of the voltage controlled oscillator 48 is coupled to the frequency divider 50, and the output of the frequency divider 50 is coupled to the second input 46 of the phase comparator 42 to complete the phase-locked loop.

The MSK modulator 26 of the present embodiment comprises a phase comparator 56, a voltage controlled oscillator 58, a first and second frequency divider 60,62, a quadrature hybrid 64 and a first and second mixer circuit 66,68 operating as part of a second phase-locked loop. The MSK modulator 26 functions to receive the baseband analog quadrature signals 38,40, modulate the 1.7 GHz error signal with them, and impress these data signals on the first IF signal 52 which is then multiplied to the Ku-band by the action of the phase-locked loop so that it can be transmitted to the satellite 4. Furthermore, in the present embodiment, the MSK modulator 26 and the phase-locked loop 22 form a series of phase-locked loops responsive to the 111 MHz so as allow the frequency of the MSK modulated carrier signal 76 to vary by predefined steps to accommodate the frequency division multiple access techniques utilized by the VSAT network 10.

Referring to FIG. 2, the first IF signal 52 produced by the phase-locked loop circuit 22 is coupled to a first input 70 of the phase comparator 56. As explained below, a second input 72 of the phase comparator 56 receives an MSK modulation signal generated by the summation of the output signals of the mixer circuits 66,68. The output signal of the phase comparator 56 is coupled to the voltage controlled oscillator 58 via a low pass filter 78. The voltage controlled oscillator 58 in conjunction with the phase comparator 56 functions to generate a Ku band frequency carrier signal phase modulated in accordance with the modulation signal. The MSK modulated carrier signal 76 output by the voltage controlled oscillator 58 is coupled to the power amplifier 28 and then transmitted via an ortho-mode transducer 74 to an antenna 12. The power amplifier 28 comprises a saturated (i.e., non-linear) amplifier.

The output of the voltage controlled oscillator 58 is also coupled to a frequency divider 60 which downconverts the MSK modulated carrier signal 76 to a second IF signal 75. This second IF signal 75 is coupled to the input of the quadrature hybrid 64. A first output of the quadrature hybrid 64 remains in phase with the second IF signal 75 and is coupled to an input of the first mixer circuit 66. A second output of the quadrature hybrid 64 is 90 degrees out of phase with the second IF signal 75 and is coupled to an input of the second mixer circuit 68. The I and Q quadrature signals 38,40 are also coupled to second inputs of the first and second mixer circuits 66,68, respectively. The output of the first and second mixer circuits 66,68 are summed so as to form a frequency modulated signal containing the modulation formation of the final MSK modulation signal 76. This signal 91 is then divided from the second intermediate frequency to the first intermediate frequency and coupled to the second input 72 of the phase comparator 56 to complete the phase-locked loop.

As stated above, the transmitter 20 of the present invention utilizes the minimum shift keying modulation technique to produce an MSK modulated carrier signal 76 having a constant amplitude envelope and a continuous phase waveform. As a result, only the phase of the MSK modulated carrier signal 76 is modulated and a high power non-linear amplifier 28 can be utilized to amplify the MSK modulated carrier signal 76.

Referring again to FIG. 2, the outdoor unit 14 of the VSAT network 10 also comprises a receiver chain 80 for receiving the downlink signal from the satellite. The receiver chain 80 comprises a low noise amplifier and a downconverter which transforms the received signal into a corresponding intermediate frequency signal. This signal is then coupled to the indoor unit 16, where it is further demodulated so as to create the data transmitted from the central hub station 2, which is then processed accordingly.

Figure 3:
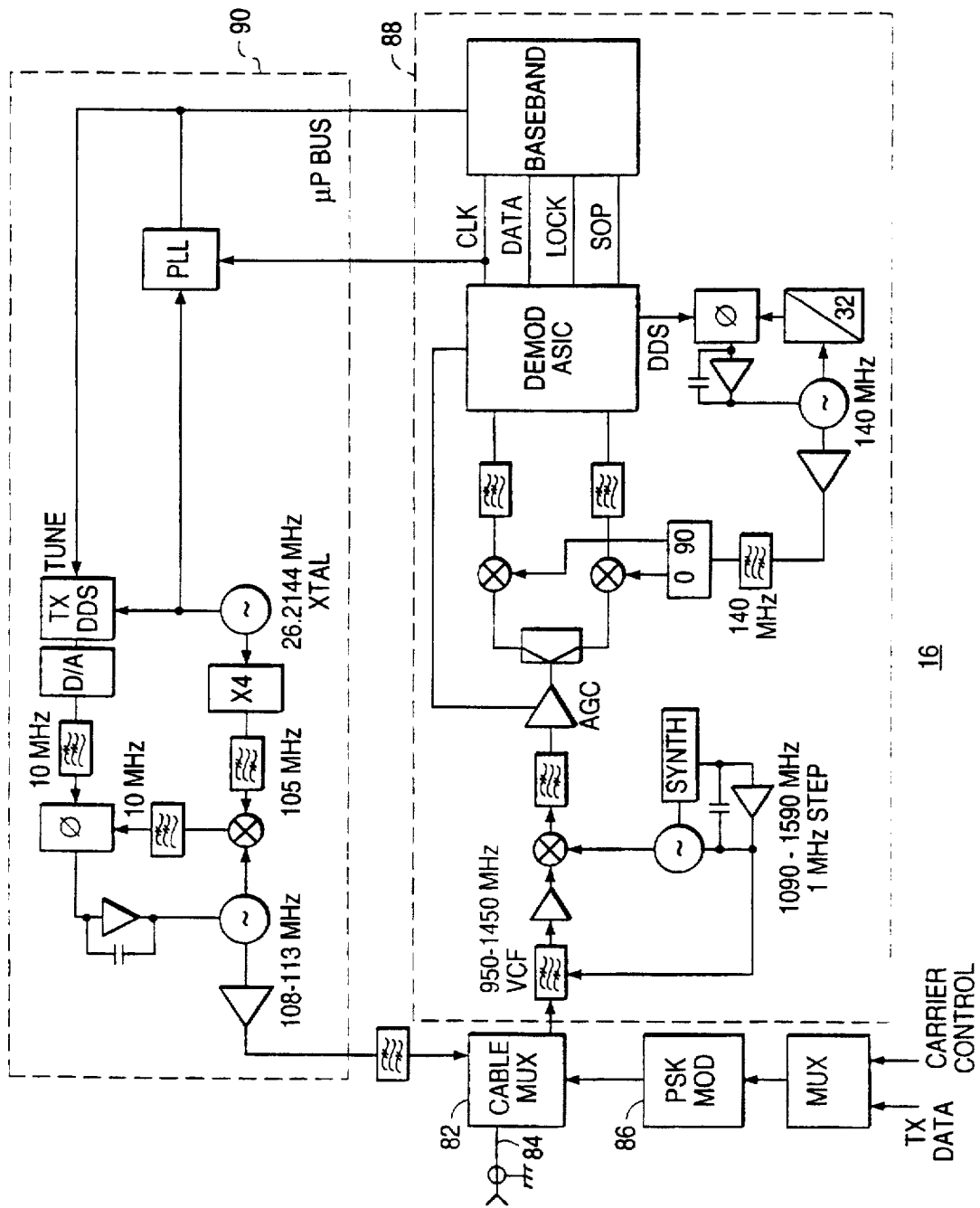
FIG. 3 is a schematic diagram of one embodiment of an indoor unit of the VSAT satellite communication network of FIG. 1.

FIG. 3 illustrates one embodiment of the indoor unit 16 of the VSAT network 10 of FIG. 1. As shown in FIG. 3, the indoor unit 16 comprises a multiplexor 82 having an input/output port 84 which is coupled to the multiplexor 30 of the outdoor unit 14 via a cable. The indoor unit 16 also comprises a modulation circuit 86 which generates the 40 MHz signal and impresses upon that signal the data to be transferred to the outdoor unit 14. The modulator 86 receives its input from a multiplexor circuit which combines the data to be transmitted with a control signal ("carrier signal") which is used in the outdoor unit 14.

The indoor unit 16 further comprises a receiver chain 88 for further demodulating and recreating the data contained in the downlink signal. Finally, the indoor unit 16 comprises circuitry 90 for generating the 111 MHz reference signal 31 which is coupled to the input of the phase-locked loop circuit 22 of the transmitter 20 of the present invention. As shown, the frequency of the 111 MHz reference signal 31 can be varied so as to provide predefined steps to accommodate the frequency division multiple access techniques utilized by the VSAT network.

The transmitter of the present invention provides numerous advantages. First, the MSK modulated carrier signal can be amplified by a saturated or non-linear amplifier. Such saturated power amplifiers can be manufactured for significantly less than the linear amplifiers required by the prior art devices, thereby reducing the overall cost of the remote ground terminals.

Another advantage is that the saturated power amplifier can attain a power added efficiency of 40% or greater, as compared to a linear power amplifier which typically attains only a 10–15% efficiency in the applicable frequency ranges. As such, the power consumption of the VSAT terminal is advantageously reduced.

Yet another advantage of the transmitter of the present invention is the simplification of the circuitry necessary for controlling the output power levels of the transmitted signal. As the VSAT system must operate over a wide temperature range, prior art transmitters employing PSK modulation techniques and linear amplifiers required a closed loop power control circuit to prevent variations in the output power level due to changes in temperature. However, the use of the saturated power amplifier eliminates such power output variations, as well as the need for the power control unit.

Furthermore, while the embodiment of the invention described above discloses the use of MSK modulation techniques for implementing the invention, any frequency modulation technique which produces a signal having a constant envelope amplitude can be utilized.

Of course, it should be understood that a wide range of other changes and modifications can be made to the preferred embodiment described above. It is therefore intended that the foregoing detailed description be regarded as illustrative rather than limiting and that it be understood that it is the following claims, including all equivalents, which are intended to define the scope of the invention.

What is claimed is:

1. A transmitter for transmitting a frequency modulated data signal to a satellite, said transmitter comprising:

a source of data signals; and a modulator, operative to receive a data signal from said source of data signals, said modulator comprising a phase-locked loop having an oscillator that produces an output signal comprising a frequency modulated carrier signal having a constant envelope amplitude and a feedback portion including a mixer that mixes the data signal with the output signal to produce a data modulated signal that controls the operation of the oscillator.

2. A transmitter for transmitting a frequency modulated data signal according to claim 1, wherein said output signal is a minimum shift key modulated carrier signal.

3. A transmitter for transmitting a frequency modulated data signal according to claim 2, wherein said modulator comprises a first and second mixer circuit;

said first mixer circuit having a first input for receiving a component of said output signal and a second input for receiving data signals from said source of data signals;

said second mixer circuit having a first input for receiving the component of said output signal phase shifted 90 degrees and a second input for receiving data signals from said source of data signals; and wherein said first and second mixer circuits include outputs that are coupled to one another so as to form the data modulated signal comprising a constant envelope minimum shift key modulated signal.

4. A transmitter for transmitting a frequency modulated data signal according to claim 3, wherein said source of data signals provides data signals in a quadrature format having a leading signal coupled to said second input of said first mixer circuit, and a lagging signal coupled to said second input of said second mixer circuit.

5. A transmitter for transmitting a frequency modulated data signal according to claim 1, further comprising:

a power amplifier, operative to receive said frequency modulated carrier signal from the modulator and to amplify the frequency modulated carrier signal to the desired power level.

6. A transmitter for transmitting a frequency modulated data signal according to claim 5, wherein said power amplifier is operated in the saturation mode.

7. A transmitter for transmitting a frequency modulated data signal according to claim 6, further comprising an antenna coupled to said power amplifier, said antenna operative to receive said frequency modulated carrier signal and to transmit said frequency modulated carrier signal to said satellite.

8. A transmitter for transmitting a frequency modulated data signal according to claim 1, wherein said output signal is in the Ku frequency band.

9. A transmitter for transmitting a frequency modulated data signal according to claim 1, wherein said phase-locked loop includes a phase comparator that compares the phases of the data modulated signal and a reference signal.

10. A method for transmitting a modulated data signal to a satellite comprising:

receiving data from a data source;

using an oscillator within a phase-locked loop to produce a frequency modulated carrier signal having a constant envelope amplitude;

modulating the frequency modulated carrier signal with data received from said data source to produce a data modulated signal in a feedback portion of the phase-locked loop; and controlling the operation of the oscillator using the data modulated signal.

11. The method for transmitting a modulated data signal to a satellite according to claim 10, wherein said frequency modulated carrier signal is modulated using a minimum shift key technique.

12. The method for transmitting a modulated data signal according to claim 11, wherein said frequency modulated carrier signal is amplified by a saturated amplifier.

13. The method of transmitting a modulated data signal according to claim 11, wherein the step of modulating includes the step of using a first and a second mixer circuit;

said first mixer circuit having a first input for receiving a portion of said frequency modulated carrier signal and a second input for receiving data signals from said source of data signals;

said second mixer circuit having a first input for receiving a portion of said frequency modulated carrier signal phase shifted 90 degrees and a second input for receiving data signals from said source of data signals; and wherein said first and second mixer circuits include outputs that are coupled to one another so as to form a constant envelope minimum shift key modulated signal.

14. The method of transmitting a modulated data signal according to claim 13, wherein said source of data signals provides data signals in a quadrature format having a leading signal coupled to said second input of said first mixer circuit, and a lagging signal coupled to said second input of said second mixer circuit.

15. The method for transmitting a modulated data signal according to claim 10, further comprising amplifying said frequency modulated carrier signal to a predetermined level.

16. The method for transmitting a modulated data signal according to claim 10, further comprising coupling said frequency modulated carrier signal to an antenna which transmits said frequency modulated carrier signal to said satellite.

17. The method for transmitting a modulated data signal according to claim 10, wherein said frequency modulated carrier signal is in the Ku frequency band.

18. A method for transmitting a modulated data signal to a satellite according to claim 10, further including the step of comparing the phases of the data modulated signal and a reference signal to produce a control signal and using the control signal to control the operation of the oscillator.

19. A method for transmitting a modulated data signal to a satellite comprising:

receiving data from a data source;

generating an intermediate frequency signal from a constant envelope modulated carrier signal;

modulating said intermediate frequency signal in accordance with data received from said data source so as to produce a constant envelope frequency modulated signal; and multiplying said constant envelope frequency modulated signal utilizing a phase-locked loop so as to generate the constant envelope modulated carrier signal.

20. The method for transmitting a modulated data signal to a satellite according to claim 19, wherein said intermediate frequency signal is modulated using a minimum shift key technique.

21. The method for transmitting a modulated data signal according to claim 19, further comprising amplifying said modulated carrier signal to a predetermined level.

22. The method for transmitting a modulated data signal according to claim 21, wherein said modulated carrier signal is amplified by a saturated amplifier.

23. The method for transmitting a modulated data signal according to claim 21, further comprising coupling the amplified modulated carrier signal to an antenna which transmits the amplified modulated carrier signal to said satellite.

24. The method for transmitting a modulated data signal according to claim 23, wherein said modulated carrier signal is in the Ku frequency band.

* * * * *